May 15, 1962   R. H. BAUMAN   3,034,603
AUTOMATIC BRAKE ADJUSTER
Filed July 21, 1960   2 Sheets-Sheet 1

INVENTOR
Robert H. Bauman
BY
HIS ATTORNEY

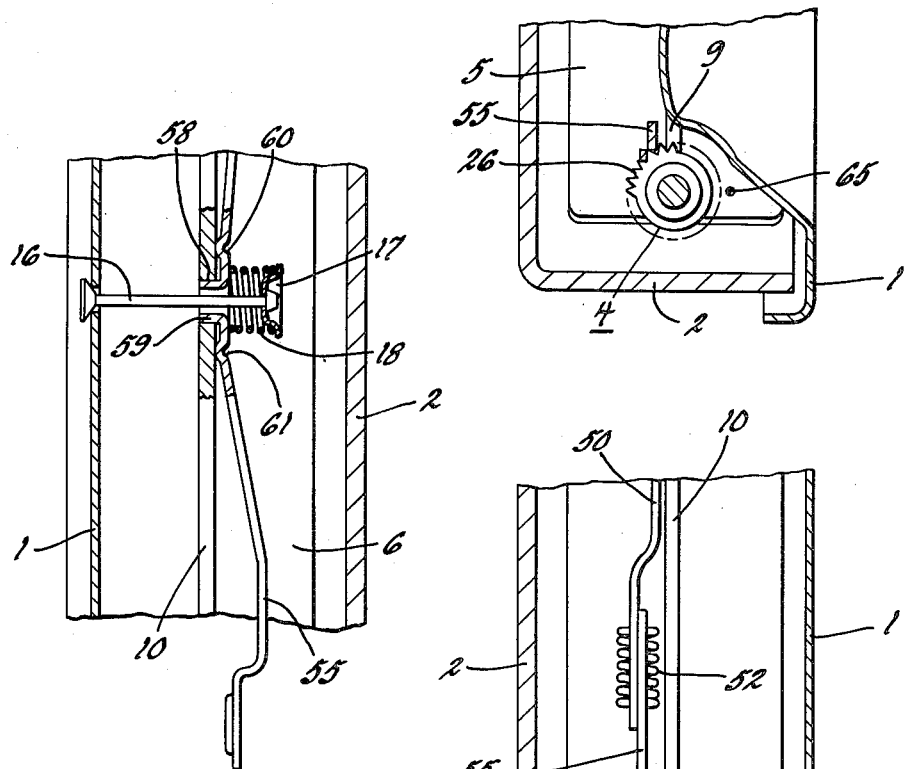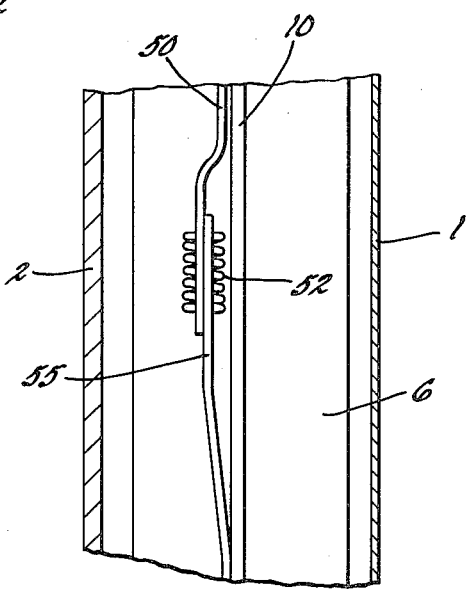

United States Patent Office 3,034,603
Patented May 15, 1962

3,034,603
AUTOMATIC BRAKE ADJUSTER
Robert H. Bauman, Dayton, Ohio, assignor to General Motors Corporation, Detroit, Mich., a corporation of Delaware
Filed July 21, 1960, Ser. No. 44,371
7 Claims. (Cl. 188—79.5)

This invention relates to a vehicle brake and more particularly to a means for adjusting a vehicle drum brake.

The vehicle drum brake as used on many of the present-day motor vehicle requires manual adjustment of an adjustable strut to provide the proper clearance between the brake shoes and the brake drum. The manually adjusting of the vehicle brake requires periodic service and inconvenience to the operator of the motor vehicle. This inconvenience can be eliminated by providing an automatic brake adjuster in combination with the vehicle drum brake. Accordingly, this invention is proposed to provide the advantage of automatic brake adjustment operating in response to braking of the motor vehicle.

It is an object of this invention to provide an automatic brake adjuster for operation in combination with a vehicle drum brake.

It is another object of this invention to provide an automatic brake adjuster having built-in means for preventing overadjustment of the vehicle brakes.

It is a further object of this invention to provide a simple bearing structure for the pivoting arm which engages the ratchet wheel of the adjustable strut in adjusting of the vehicle brakes.

The objects of this invention are accomplished by a pivoting arm pivotally mounted on one of the brake shoes. The pivoting arm is connected by a link to the anchor pin which provides the actuating force for the brake adjuster when the vehicle brakes are adjusted in the reverse rotation of the braking cycle. A resilient means is positioned between the actuating link and the pivoting arm to prevent overadjustment of the vehicle brakes. A second spring is positioned between the pivoting arm and the brake shoe to prevent rattling and to position the pivoting arm in its retracted position when the vehicle brakes are released.

The pivoting means for the pivoting arm includes a perforation in the brake shoe webbing for reception of the pivoting arm and also a portion of the pivoting arm to provide a bearing surface to prevent tilting of the pivoting arm during operation of the pivoting arm against the ratchet wheel. This insures positive operation of the brake adjuster when the brakes are in need of adjustment.

Further objects and advantages of the present invention will be apparent from the following description, reference being had to the accompanying drawings, wherein a preferred embodiment of the present invention is clearly shown.

In the drawings:

FIGURE 3 is a cross-section view taken on line 3—3 of FIGURE 1.

FIGURE 4 is a cross-section view taken on line 4—4 of FIGURE 1.

FIGURE 5 is a cross-section view taken in the direction as indicated by arrow 5 in FIGURE 1.

Figure 1:
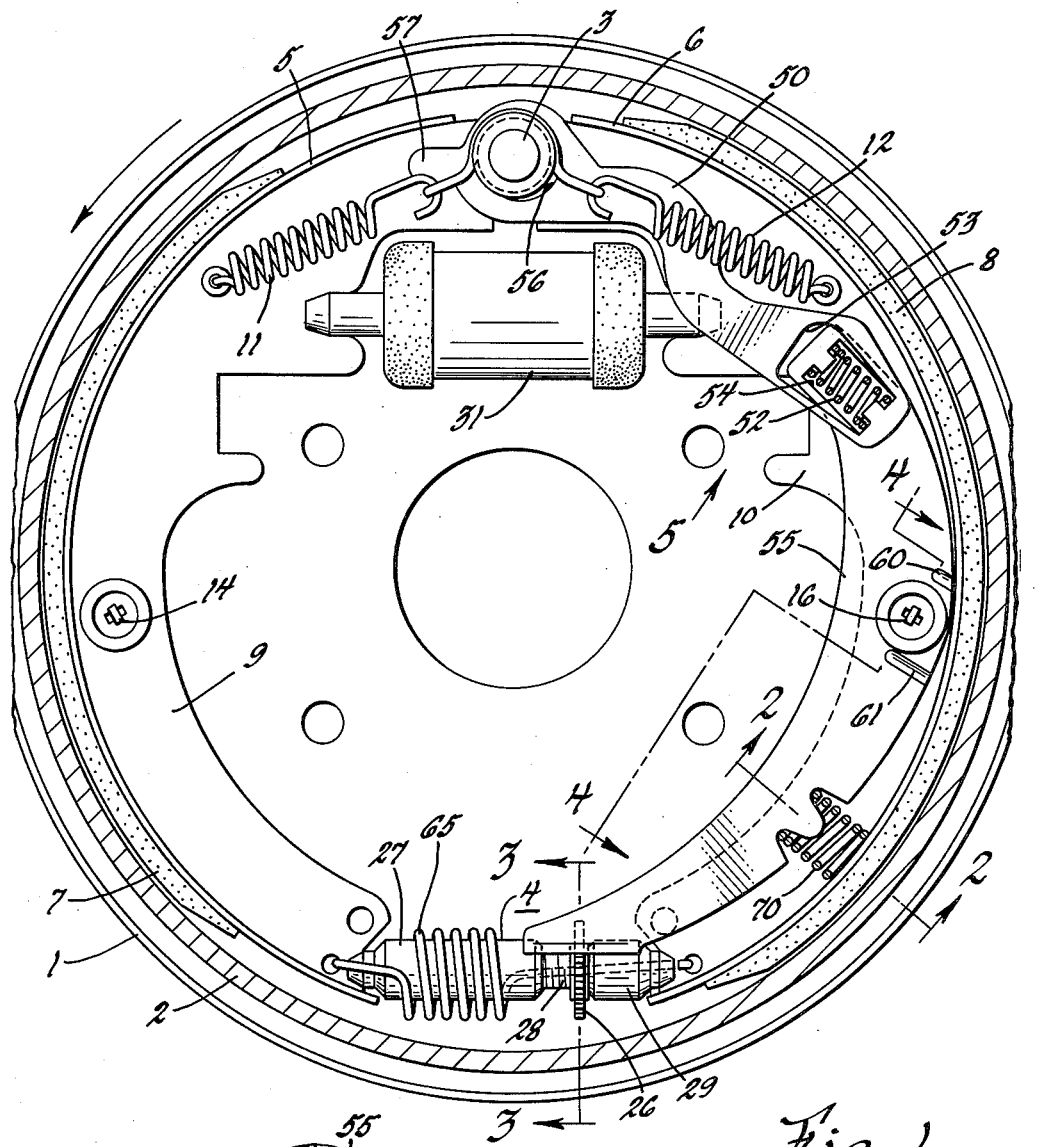
FIGURE 1 is a cross-section view of a brake drum illustrating the relative position of the various parts within the braking structure and the brake adjuster.
Figure 2:
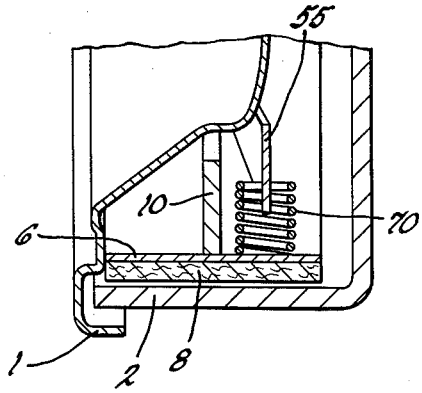
FIGURE 2 is a cross-section view taken on line 2—2 of FIGURE 1.

FIGURE 1 illustrates generally the positioning of the relative parts of the braking structure in combination with an automatic brake adjuster. The backing plate 1 provides the supporting means for the anchor pin 3. The rotating brake drum 2 is mounted adjacent to the backing plate 1. The brake shoes 5 and 6 are mounted within the inner periphery of the rotating brake drum 2. Two of the cooperative adjacent ends of the brake shoes 5 and 6 engage the anchor pin 3 in the normally retracted position due to the biasing force of the retraction springs 11 and 12. The brake shoes 5 and 6 are provided with friction material 7 and 8, respectively, for engaging of the inner periphery of the brake drum 2. The hydraulic wheel cylinder 31 is positioned between the cooperative adjacent ends of the brake shoes 5 and 6 and provide an actuating means for the vehicle brakes.

The hold-down pin assembly 14 positions the brake shoe 5 relative to the backing plate 1. The opposite two cooperative adjacent ends of the brake shoes 5 and 6 contact opposing ends of the adjustable strut 4. The adjustable strut 4 includes the sleeve 27 having a threaded inner periphery for reception of the adjusting screw 28. The adjusting screw 28 is formed with a ratchet wheel 26 about its outer periphery which is operated by the brake adjuster. The opposite end of the adjusting screw 28 has a smooth cylindrical shank for reception within a mating opening end of the sleeve 29 which engages the brake shoe webbing 10 of brake shoe 6. A biasing force is provided by the concentric spring 65 mounted for reception of the adjustable strut 4 and engaging the opposite two cooperative adjacent ends of the brake shoes 5 and 6.

The automatic brake adjuster includes the link 50 which is connected to the anchor pin 3 and extends to a point of parallel engagement with the pivoting arm 55. An override spring 52 is positioned within an opening 53 of the link 50 and also within the opening 54 of the pivoting arm 55. The link 50 has an oversized opening 56 for reception of an anchor pin 3 and also an extending ear 57 extending in the opposite direction from the major portion of the link 50. The ear 57 prevents a tilting action of the link 50 during its operation. A slight tilting moment of force is created by the override spring 52 due to the fact that the force transmitted from the link 50 to the pivoting arm 55 is not in direct opposition to each other but are merely parallel to each other and contact the lateral surfaces of each other. This moment arm is overcome by the ear 57 which prevents the tilting of the link 50.

The pivoting arm 55 is pivotally mounted on the webbing 10 of the brake shoe 6. The pivoting structure is shown more clearly in FIGURE 4 wherein the hold-down pin 16 and the assembly retain the pivoting lever in the perforation 58 of the brake shoe webbing 10. The pivoting arm 55 is formed with an axially extending sleeve portion 59 for reception within the hole 58 for the brake shoe webbing 10. To further stabilize for pivotally rotational movement of the pivoting arm 55 two parallel creases 60 and 61 are formed in the pivoting arm 55. These creases form a bearing contact for the pivoting arm 55 on the brake shoe webbing 10.

As the pivoting arm 55 engages the ratchet wheel 26 for rotational movement of the ratchet wheel, the arm receives a tilting force tending to pivot the arm away from the ratchet wheel. The axial movement of the arm tending to cause a tilting of the arm 55 in the hole 58 is prevented by the sleeve portion 59 and also the creases 60 and 61 formed on the pivoting arm. In this manner the movement of the pivoting arm 55 is restrained to a purely rotation movement about the axis of the pin 16.

The pin 16 extends through the opening 58 in the brake shoe webbing 10 and also concentrically through the sleeve portion 59 of the pivoting arm 55. The pin engages the spring seat 17. The spring seat 17 compressibly positions the spring 18 between the pivoting arm 55 and the spring seat 17 to maintain the relative position of the pivoting arm 55 with the brake shoe webbing 10.

The concentric spring 65 receives the internally threaded sleeve 27 which engages one end of the brake shoe webbing 9 of the brake shoe 5. The spring 65 creates an axial thrust through the adjustable strut 4 which comprises the sleeve 29 and the sleeve 27. The adjusting screw 28 is operated by the ratchet wheel 26. The spring 65 is concentrically located at the outer periphery of the threaded sleeve 27 and extends to engage the cooperative adjacent end of the brake shoe webbings providing a purely axial thrust through the strut member and does not engage the ratchet wheel 26. The ratchet wheel 26 has a free rotational movement due to the force of the pivoting arm 55. The pivoting arm 55 never completely disengages from the ratchet wheel 26 and in this manner prevents counter-rotation once the vehicle brakes are adjusted. The pivoting arm eliminates the need for frictional engagement of the spring to prevent counter-rotation of the ratchet wheel as was previously used on the vehicle brake adjusters which were manually operated.

The automatic brake adjuster operates in the following described manner. The adjuster operates on reverse rotation of a brake drum during operation of the vehicle brakes. As the vehicle brakes are actuated through the wheel cylinder 31 the brake shoes are expanded to engage the inner periphery of the brake drum 2. During reverse rotation of the brake drum the rotation of the drum is opposite to the forward rotation arrow as indicated in FIGURE 1. The brake shoes shift circumferentially within the brake drum 2 causing a relative movement of the brake shoe 6 away from the anchor pin 3. This movement of the brake shoe 6 causes the brake shoe 5 to firmly abut the anchor pin 3 on the opposite side of the anchor pin. The movement of the brake shoe 6 also creates a movement of the pivoting arm 55 on the brake shoe webbing 10, which compresses the spring 52 as the link 50 is anchored to the anchor pin 3. With the compression of the spring 52 a force is transmitted to the connecting end of the pivoting arm 55. The force causes a rotational movement of the pivoting arm 55 in a counterclockwise rotation wherein the engaging portion of the arm 55 engages the ratchet wheel 26 causing the rotation of the ratchet wheel. If a predetermined clearance exists between the brake shoes and the brake drum in their retracted position, an adjustment of the brakes is made at this time. The adjustment is accomplished by the rotation of the ratchet wheel 26 which elongates the adjustable strut forcing the brake shoe ends engaging the strut outwardly. It can be seen that as the pivoting arm 55 rotates due to the force transmitted through the spring 52, the end of the pivoting arm adjacent to the ratchet wheel has a tendency to lift slightly due to its engagement with the wheel. This tilting tendency is prevented on the central portion of the arm 55 by the greater bearing area caused by the creases 60 and 61 on the pivoting arm 55. With the greater bearing surface engaging the brake shoe webbing the tendency of the shoe to tilt is decreased thereby restraining the movement of the pivoting arm to a purely rotational movement.

As the vehicle brakes are retracted, the pivoting arm 55 returns to its originally retracted position due to the biasing force of the spring 70 and the over-ride spring 52. These two springs return the pivoting arm to its normally retracted position which, however, is still in an engaging position with the ratchet wheel 26 which prevents counter-rotation of the ratchet wheel and maintains the adjusted position of the vehicle brakes.

In the event the vehicle brakes are sufficiently adjusted at the time of the braking cycle the brakes are not further adjusted due to the over-ride spring 52. The over-ride spring is preloaded prior to assembly of the vehicle brakes. The preloading is to provide a brake adjustment through the resilient force transmitting means of the spring 52. The spring 52 must be preloaded sufficiently to overcome the spring 70 and also rotate the ratchet wheel 26.

In the event that sufficient adjustment of the brakes is present at the time of the reverse braking cycle, a considerable force is created on the threaded portion of the adjustable strut which prevents further rotation of the ratchet wheel 26. In this manner the force created through the shifting movement of the brake shoe 6 transmitted from the anchor pin 3 is not transmitted through the whole system but is absorbed in the spring 52 as the brakes are operated. This prevents heavy stress being placed on the arm 55 in the event that the vehicle brakes are sufficiently adjusted. In effect, it operates as a safety feature to prevent excessive stress applied to the system and also to prevent the overadjustment of the vehicle brakes.

While the embodiment of the present invention as herein disclosed constitutes a preferred form, it is to be understood that other forms might be adopted.

What is claimed is as follows:

1. A vehicle drum brake, comprising in combination, a backing plate having an anchor, a vehicle brake drum rotatably mounted adjacent to said backing plate, two brake shoes for frictionally engaging said brake drum and having cooperative adjacent ends, two of said cooperative adjacent ends of said brake shoes engaging said anchor in the retracted position, a shoe actuating means operatively placed between said two cooperative adjacent ends of said brake shoes, an extendible strut positioned between the opposite two cooperative adjacent ends of said brake shoes and including means to extend said strut, an automatic brake adjuster including a pivoting arm pivotally mounted on one of said brake shoes, a connecting link connected to said anchor, an over-ride spring positioned for transmitting force from said connecting link to said pivoting arm and resiliently permitting movement therebetween when said arm is held against movement, said pivoting arm extending to a position adjacent to said strut for extension of said adjustable strut when the vehicle brakes are operated.

2. In a vehicle drum brake comprising in combination, a backing plate having an anchor pin, a vehicle brake drum rotatably mounted adjacent to said backing plate, two brake shoes for frictionally engaging said brake drum and having cooperative adjacent ends, two of said cooperative adjacent ends of said brake shoes resting against said anchor pin in a normally retracted position, a hydraulic means operatively positioned between said two cooperative ends of said brake shoes for actuating the vehicle brakes, an adjustable strut positioned between the opposite two cooperative adjacent ends of said brake shoes, a spring concentrically located around said adjustable strut maintaining a biasing force for contacting said opposite two cooperative adjacent ends of said brake shoes with said adjustable strut, an automatic brake adjuster including a link connected to said anchor pin, a pivoting arm pivotally mounted on one of said shoes, an over-ride spring positioned for engaging said link and said pivoting arm, said pivoting arm extending to a position adjacent to said ratchet wheel for providing rotation movement of said ratchet wheel, a third spring engaging said pivoting arm compressively positioned between said arm and said one brake shoe to provide a biasing force to return said pivoting arm to a normal retracted position when said vehicle brakes are retracted.

3. In a vehicle drum brake comprising in combination, a backing plate, a brake drum rotatably mounted adjacent to said backing plate, an anchor pin mounted on said backing plate, two brake shoes for frictionally engaging the inner periphery of said brake drum, shoe actuating means operatively positioned between two ends of said two brake shoes, an adjustable strut positioned between the opposite two cooperative adjacent ends of said brake shoes, an automatic brake adjuster including a link connected to said anchor pin having an ear extending parallel to one of said brake shoes to prevent tilting movement of said link, a pivoting arm pivotally mounted on the other of said brake shoes, an over-ride spring compressively positioned between said link and said pivoting arm, said pivoting arm extending to a position adjacent to said strut and operating against an additional spring compressively mounted between said pivoting arm and said first brake shoe, said pivoting arm adjustably operating said strut to adjust said vehicle brakes when said vehicle brakes are operated in the reverse rotation braking cycle.

4. In a vehicle drum brake comprising in combination, a backing plate having an anchor pin, a vehicle brake drum rotatively mounted adjacent to said backing plate, two brake shoes mounted within said brake drum for frictional engagement of said brake drum and having cooperative adjacent ends, two of said cooperative adjacent ends resting against said anchor pin in the normally retracted position, hydraulic means operatively positioned between said two cooperative adjacent ends of said brake shoes, an adjustable strut positioned between the opposite two cooperative adjacent ends of said brake shoes, a concentric spring located concentrically around said adjustable strut and producing a biasing force to contact said opposite two cooperative adjacent ends of said brake shoes with the ends of said adjustable strut, an automatic brake adjusting device including a link connected to said anchor pin, a pivoting arm pivotally mounted on the first of said brake shoes, an over-ride spring positioned in a perforation of said link and a perforation of said pivoting arm to transmit an actuating force from said anchor pin to said pivoting arm, an ear extending parallel to the webbing of said second brake shoe to prevent tilting of said link on actuation of said brake adjuster, said pivoting arm extending to a position adjacent to said ratchet wheel to provide rotation of said ratchet wheel and extension of said adjustable strut to adjust said vehicle brake when said vehicle brakes are actuating.

5. In a vehicle drum brake comprising in combination, a backing plate having an anchor pin, a vehicle brake drum rotatively mounted adjacent to said backing plate, two brake shoes mounted within for frictional engagement of said brake drum and having cooperative adjacent ends, two of said cooperative adjacent ends positioned for contacting position on said anchor pin in a normally retracted position, hydraulic means operatively positioned between said two cooperatively adjacent ends of said brake shoes, an adjustable strut positioned between the opposite two cooperative adjacent ends of said brake shoes, a concentric spring connected to said opposite two cooperative adjacent ends of said brake shoes and located concentrically around said adjustable strut to provide a biasing force for contacting the end of said adjustable strut with said opposite two cooperative ends of said brake shoes directly through said adjustable strut, an automatic brake adjuster including a link connected to said anchor pin, an opening in said link for reception of an over-ride spring, a pivoting arm pivotally mounted on the first of said brake shoes, an opening provided in said pivoting arm for the reception of said over-ride spring, said over-ride spring providing transmission of a force for actuation of said automatic adjuster, said pivoting arm extending to a position adjacent to said ratchet wheel to provide automatic adjustment of said vehicle brakes by rotation of said ratchet wheel and elongation of said adjustable strut when said vehicle brakes are operated in reverse rotation of said drum.

6. In a vehicle drum brake, the combination, a backing plate having an anchor, a brake drum rotatably mounted adjacent to said backing plate, two brake shoes mounted within said brake drum and having cooperative adjacent ends engaging said anchor in the normally retracted position, actuating means for actuating said vehicle brakes positioned between two of said cooperative adjacent ends of said brake shoes, an extendible strut positioned between the opposite two cooperative adjacent ends of said brake shoes, an automatic brake adjuster including a pivoting arm pivotally mounted on one of said two brake shoes, a return spring compressively mounted between said pivoting arm and said one brake shoe, a connecting link connecting with said anchor and having an opening formed therein, said pivoting arm having an opening formed therein, an over-ride spring positioned in the opening of said link and the opening of said pivoting arm to transmit thereby an actuating force from said anchor to said pivoting arm and provide resilience to movement therebetween when said arm is held against movement, said pivoting arm extending to a point adjacent to said strut to extend the same and adjust said brakes when said vehicle brakes are operated.

7. In a vehicle drum brake comprising in combination, a backing plate having an anchor pin, a vehicle brake drum rotatively mounted adjacent to said backing plate, two brake shoes mounted within said brake drum for frictional engagement of the inner periphery of said brake drum and having cooperative adjacent ends, two of said cooperative adjacent ends of said brake shoes resting on said anchor pin in a normally retracted position, hydraulic means for actuating said vehicle brakes positioned between said two cooperative adjacent ends of said brake shoes, an adjustable strut positioned between the opposite two cooperative adjacent ends of said brake shoes, a concentric spring concentrically located about the outer periphery of said adjustable strut and providing a biasing force directed through said adjustable strut to maintain constant contact between the ends of said adjustable strut and said opposite two cooperative adjacent ends of said brake shoes, an automatic brake adjuster including a connecting link connected to said anchor pin, an opening formed in said connecting link for the reception of an over-ride spring, a pivoting link pivotally mounted to the first of said brake shoes, an opening formed in said pivoting link for reception of said over-ride spring to provide an actuating force transmitted through said over-ride spring from said link to said pivoting arm, a return spring positioned between said pivoting arm and said first of said brake shoes, said pivoting arm extending to a position adjacent to said ratchet wheel to provide rotation of said ratchet wheel upon actuating of said brakes, said link having an ear extending parallel to the second of said brake shoes to prevent tilting of said link when said brake adjuster is in operation, said over-ride spring providing a resilient means to absorb a force transmitted from said anchor pin to said pivoting link to prevent overstressing of said arm when the vehicle brakes are operated.

References Cited in the file of this patent

UNITED STATES PATENTS

| | | |
|---|---|---|
| 2,130,857 | Press | Sept. 20, 1938 |
| 2,301,272 | Goepfrich | Nov. 10, 1942 |
| 2,762,463 | Brooks | Sept. 11, 1956 |
| 2,938,610 | Dombeck et al. | May 31, 1960 |